United States Patent
Schwartz

(10) Patent No.: US 6,937,746 B2
(45) Date of Patent: Aug. 30, 2005

(54) SYSTEM AND METHOD FOR AUTOMATIC RECOGNITION OF FORMATIONS IN MOVING TARGET INDICATION DATA

(75) Inventor: Steven A. Schwartz, Melbourne Beach, FL (US)

(73) Assignee: Northrop Grumman Corporation, Los Angeles, CA (US)

(*) Notice: Subject to any disclaimer, the term of this patent is extended or adjusted under 35 U.S.C. 154(b) by 400 days.

(21) Appl. No.: 09/870,805

(22) Filed: May 31, 2001

(65) Prior Publication Data

US 2003/0031367 A1 Feb. 13, 2003

(51) Int. Cl.[7] .................................................. G06K 9/00
(52) U.S. Cl. ...................................... 382/103; 382/224
(58) Field of Search ............................. 382/103–107, 382/190, 194–195, 224–228

(56) References Cited

U.S. PATENT DOCUMENTS

| | | | |
|---|---|---|---|
| 4,217,583 A | 8/1980 | Hiller et al. ................. 343/7.7 |
| 4,768,034 A | 8/1988 | Preikschat et al. ............ 342/80 |
| 5,045,860 A | 9/1991 | Hodson ....................... 342/451 |
| 5,066,956 A | 11/1991 | Martin ........................ 342/154 |
| 5,425,136 A | 6/1995 | Lo et al. ..................... 395/127 |
| 5,594,450 A | 1/1997 | Schober ...................... 342/159 |
| 5,818,383 A | 10/1998 | Stockburger et al. ....... 342/109 |
| 5,909,189 A | 6/1999 | Blackman et al. ............ 342/90 |
| 5,959,574 A | 9/1999 | Poore, Jr. .................... 342/96 |
| 6,254,394 B1 * | 7/2001 | Draper et al. ................. 434/11 |

FOREIGN PATENT DOCUMENTS

| | | | | | |
|---|---|---|---|---|---|
| GB | 2176271 A | * | 12/1986 | ........... F41F/27/00 |
| GB | 2333198 A | * | 7/1998 | ........... G01S/13/00 |
| JP | 11-065416 A | * | 3/1999 | ............ G09B/9/00 |

OTHER PUBLICATIONS

Hagerty et al. "Real time discrimination of battlefield ordinance using remote sensing data" Aerospace Conf. Proc., 2000 IEEE, vol. 3, p.: 329–342, Mar. 2000.*

(Continued)

Primary Examiner—Jingge Wu
(74) Attorney, Agent, or Firm—Stetina Brunda Garred & Brucker

(57) ABSTRACT

A system and method for determining a threat level associated with a collection of detected objects within a geographical area of interest are disclosed. A set of formation templates representative of organizational patterns are defined. Configurations for the templates are defined. Data is collected from objects detected in the area of interest. A density image is generated based on the geographic locations of the detected objects. Sections of the density image that are too sparse to contain a formation are determined and excluded from further analysis. The density image is compared to each of the template configurations. The probability of finding points in each of the template cells for each of the template configurations is determined. The probable formation(s), if any, based on the probability of finding points in each of the template cells for each of the possible configurations of each of the possible templates is determined. If this probability is greater than the null hypothesis (no formations), probable formation(s), if any, are reported.

22 Claims, 7 Drawing Sheets

OTHER PUBLICATIONS

Wesche et al. "Applications of teh responsive Workbench" Computer Graphics and Applications, IEEE 1997, vol. 17, issue 4, p.: 10–15, Jul. 1997.*

Ulf Grenander, *Representations of Knowledge in Complex Systems*. 1994, p. 549–601, Royal Statistical Society.

Steven A. Schwartz, (*Abstract*) *Bayesian Estimation of Protein Conformation in a Pattern–Theoretic Model When Given X–Ray Crystallographic Data*, Dec., 1995, 1 and 2, Saint Louis, Missouri.

Phillip D. Stroud and Ray C. Gordon, *Automated Military Unit Indentification in Battlefield Simulation*, SPIE vol. 3069, p. 375–385, Los Alamos, New Mexico.

Harry L. Van Trees, *Detection, Estimation, and Modulation Theory*, p. cover and 58, Massachusetts Institute of Technology.

Ulf Grenander, *The 1985 Rietz Lecture*, 1985, p. 1–30, Brown University.

* cited by examiner

MTI data are tranformed to counts in each cell.

SYSTEM AND METHOD FOR AUTOMATIC RECOGNITION OF FORMATIONS IN MOVING TARGET INDICATION DATA

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention generally relates to moving targets, and more particularly to a system and method for automatic recognition of formations in moving target indication data, particularly for ground moving targets.

Although airborne sensors of ground moving targets (GMTIs) have been in use for years, the development of moving target exploitation (MTE) tools has been of interest only recently. A military formation is defined as a collection of vehicles traveling together that has a distinguishing shape that is related to its function. A formation of vehicles are in spatial proximity to each other, traveling at approximately the same velocity and arranged in an approximation of some "ideal" geometry.

The recognition of formations is indicative of the intentions and perceptions of ground forces. For example, a wedge formation is used when aggressively moving towards contact with an enemy. A wedge allows firepower to be projected forward while offering protection on the sides. A column formation, such as a convoy is much more vulnerable to ambush and would usually be seen where there is (perceived) safety, far behind the battle line.

Hostile ground-troop formations are sometimes laid out according to a definite geometry which indicates something about the specific purpose of the ground troops, the concerns of the commander, and the element of danger that these ground troops represent to our own troops. Formation-geometries and their purposes may be defined by written doctrine for some armies, for others they may be known through past observation.

Modern sensor platforms can detect and record moving targets over a large surveillance area. Displays of moving targets appear as hundreds of unidentified points, most re-appearing in a slightly different location with each radar scan. It can be difficult for image analysts to identify formations in such a dynamic display, especially if the formations are small.

Stroud and Gordon of Los Alamos National Laboratory describe a cognitive architecture for recognizing formations in order to simulate the function of an image analyst looking at MTI data in battle simulations in "Automated military unit identification in battlefield simulation", *Proceedings of the SPIE*, Vol. 3069, pp. 375–386, 1997. The cognitive architecture has two parts: "an autonomous behavior which performs low-level cognition; and a higher level mechanism that can adapt the low-level behavior to changing environmental conditions." The low level cognition is actually a bank of 2-D cluster filters whose behavior is determined by a control-parameter set containing seven elements: (1) minimum filter scale size; (2) maximum filter scale size; (3) maximum battalion area; (4) ellipse crisping factor; (5) minimum number of blips to qualify as a battalion; (6) maximum number of blips to qualify as a battalion; and (7) maximum number of steps per cluster search. These filters are designed to be rotationally invariant and respond to geometric characteristics, such as ellipicity and triangularity, which allows the filter parameters to be utilized to infer formation shape. The parameters of this set of filters are determined autonomously by the higher level cognitive part of the algorithm. High level cognition is a genetic algorithm that subjects the control-parameter set to an evolutionary process by evaluation of its performance on multiple random data sets that are consistent with the observed conditions in the region under surveillance. The outputs of the entire process are groups of MTIs and their individual 2-D cluster-filter control-parameter sets.

This methodology automatically finds clusters over a large dynamic range of sizes and, in the process, characterizes them. However, the emphasis is on clustering (e.g., battalions) not on recognition. The characterization of formation shape is limited to what may be inferred from responses of the individual filters. Additionally, range-rate data is not utilized.

Thus, a need exists for the ability to identify recognized formation-types (e.g. wedge, column, etc.), their locations and headings, and their internal configurations (e.g. size) that can be utilized for interpretation and planning.

BRIEF SUMMARY OF THE INVENTION

The present invention is directed to a system and method for determining a threat level associated with a collection of detected objects within a geographical area of interest. The system comprises: a data detector for detecting and collecting information about a plurality of objects in the geographic area of interest; a threat intensity detector for determining the concentration or intensity of detected objects within the geographic area of interest; and a threat immediacy detector for determining the immediacy of the threat posed by the detected objects based on an organizational pattern of the detected objects. The concentration or intensity encompasses two phenomena: (1) the number of MTIs per unit area; and (2) the average Doppler frequency (or range rate) per unit area. Both are functions of geographic location.

In accordance with other aspects of the invention, the threat intensity detector generates a density image.

In accordance with still other aspects of the invention, the threat immediacy detector includes an automatic shape recognition module for comparing the density image to a predefined set of templates to determine the most likely formation and an inference reporter for reporting the most likely formation. The templates are representative of an organizational pattern.

In accordance with yet other aspects of the invention, configurations are defined for each template. The template configurations are based on at least one parameter. The at least one parameter may be one or more external parameters, one or more internal parameters, or some combination thereof. The external parameters are typically position, orientation and scale. The internal parameters are unique to each of the templates. For example, for the wedge template the internal parameter(s) could include the apex angle of the wedge.

In accordance with still other aspects of the invention, the templates comprise wedge template, an echelon template, a column template, and a vee template. Prefereably, other template shapes can be added.

In accordance with further aspects of the invention, a method for determining a military threat level associated with a collection of detected objects within a geographical area of interest comprises: defining a set of templates that are representative of organizational patterns are made up of a plurality of cells; defining a plurality of configurations for each of the templates; defining the geographic area of interest; detecting a plurality of data points in the geographic area of interest; creating a density image from the detected data points; identifying sections of the density image that are too sparse to contain a formation; determining a probability of finding points in each of the template cells for each of the template configurations; determining a probable formation based on the probability of finding points in each of the template cells for each of the template configurations; and reporting the probable formation.

In accordance with still further aspects of the invention, the data points may represent moving vehicles. The moving vehicles may be ground vehicles.

In accordance with yet further aspects of the invention, there may be a plurality of probable formations or there may be no probable formations.

BRIEF DESCRIPTION OF THE DRAWINGS

These as well as other features of the present invention will become more apparent upon reference to the drawings wherein.

DETAILED DESCRIPTION OF THE INVENTION

The present invention has an explicit data model and uses Bayesian estimation. It utilizes range-rate data to improve the estimate and it estimates geometry directly rather than relying upon inference based upon indirect filter responses to estimate geometry. Thus, it is more easily extensible to a much broader range of geometries than prior art systems. The present invention uses templates to represent formations as described in detail below.

Figure 1:
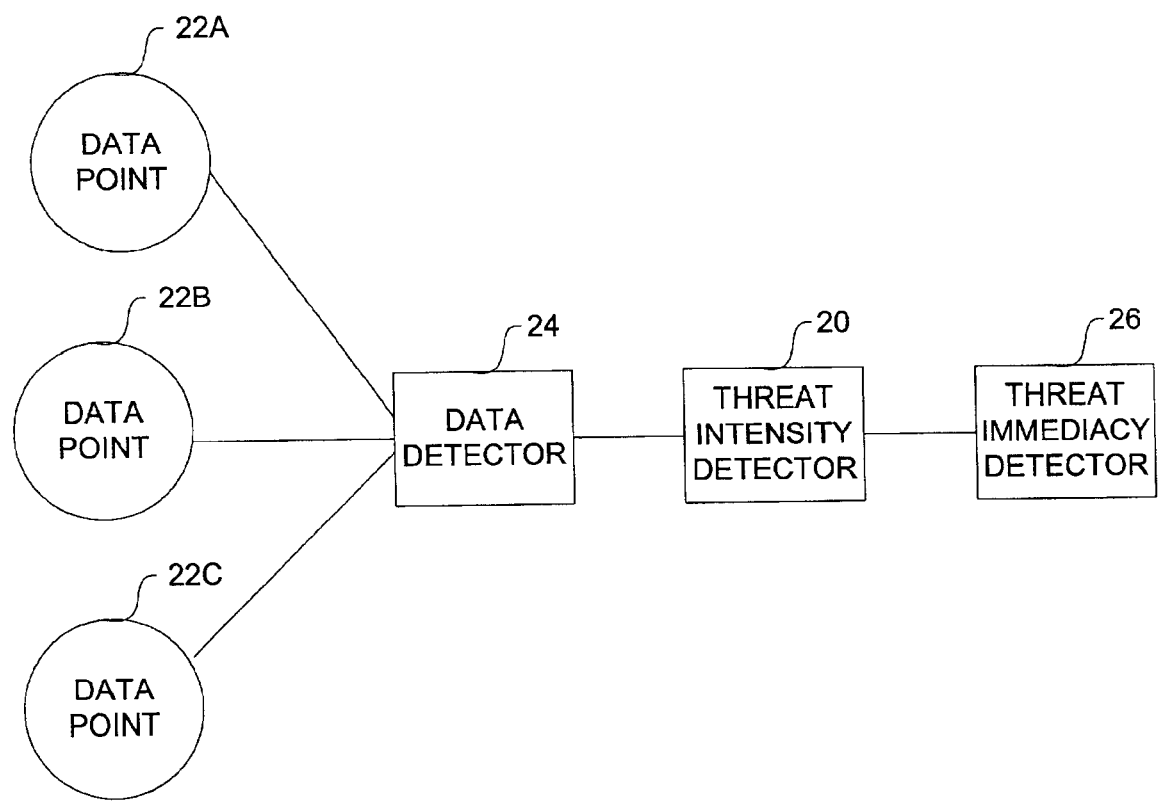
FIG. 1 is an exemplary block diagram of the major components of a system for performing automatic recognition of formations in moving target indiction data formed in accordance with the present invention.

FIG. 1 is a block diagram of the major components of an exemplary system for performing automatic recognition of formations in moving target indiction data formed in accordance with the present invention. Data is detected and collected from various data points 22A, 22B and 22C by a data detector 24. For example, data points 22A, 22B and 22C may be locations of ground based moving targets and the data detector 24 may be a military system with a moving target data collection capability, for example an aerial surveilance system. The data is forwarded from the data detector 24 to a threat intensity detector 20 which generates a density image. A threat immediacy detector 26 includes an automatic formation recognition module that uses templates to determine the probable formation(s), if any, of the detected data points 22A, 22B and 22C. The logic used by the various components of the present invention is described in detail later. It will be appreciated that the data detector 24 may be external to the threat intensity detector 20 and the threat immediacy detector 26, or may be integral (e.g., may be the same system, but different computers, or may even be the same computer). For example, the present invention may be implemented in a moving target indicator radar system that is able to monitor air and ground activities in a given area of interest. The present invention may be used on-board or offline to process collected data.

The present invention determines the most probable formation(s), if any of the detected data. The formation(s) determined to be the most probable data formation(s) may be reported using an inference reporter. It will be appreciated that the inference reporter may be an external system or may be integral with the threat immediacy detector 26. The data may be reported using a display (monitor) and/or it may be printed.

Figure 2:
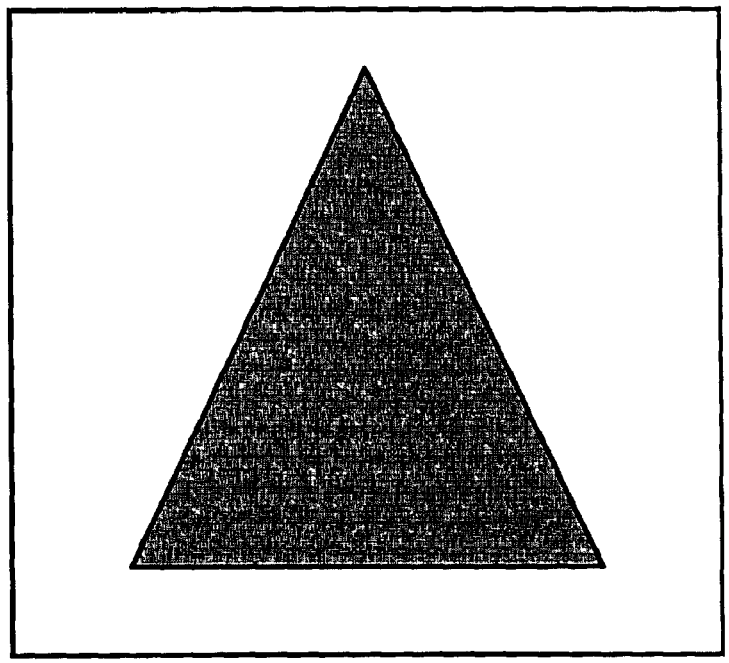
FIG. 2 is an exemplary illustration of an ideal wedge template with uniform distribution of vehicles.

Formations are selected by ground-force commanders on the basis of their functionality. For example, the commander may wish to have his vehicles uniformly distributed within a wedge-shaped formation prior to launching an attack. FIG. 2 is an exemplary illustration of an ideal wedge template with uniform distribution of vehicles. After a few hours, variability of individual driving habits on uneven and changing terrain, unexpected events such as breakdowns or weather can cause the actual formation of the ground forces to acquire a realization with random irregularities. Additional variability arises as an outcome of missed or spurious detections.

Figure 3:
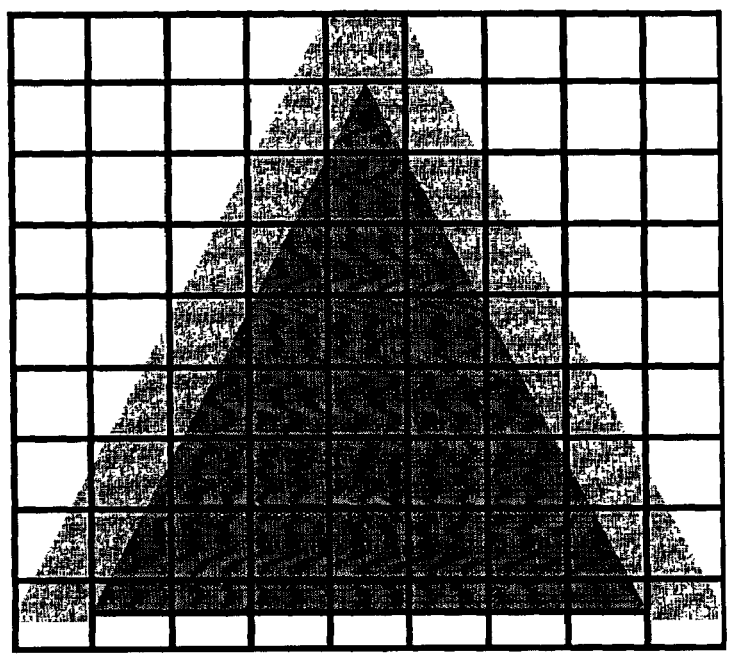
FIG. 3 is an exemplary illustration of an ideal wedge template with non-uniform distribution of vehicles.

Depending upon the optimal deployment separation for various types of vehicles and similar types of considerations, a more realistic formation might have a non-uniform vehicle density. For example, in a wedge formation, the leading edges may be populated with heavy armor, such as tanks, in order to offer protection to a much higher concentration of personnel-carrying vehicles that could be located in the interior or rear of the wedge. In such a circumstance, it may be desirable for the armored vehicles in the leading edge to be separated by a recommended, uniform distance in order to reduce fratricide and to allow for maximum flexibility in battle. In the case of tanks that are deployed on the leading edges at relatively large separations, there is a lower density of vehicles on the leading edges as opposed to the interior, for example as shown in FIG. 3.

In addition to variations in vehicle density, there may be additional variability in a wedge formation. For example, the apex angle of the wedge may change to accommodate changes in terrain (such as narrow valleys). Scale is another parameter of the wedge formation.

Definite, planned formation-geometries and their internal arrangement of vehicular densities are hereafter known as templates because they are doctrinal ideals that the ground-force commander seeks to achieve and are realized imperfectly in practice. Templates include a surrounding background of low vehicle density (designated in white) in order to account for the fact that real formations are identified by their distinction with respect to the area around them. A low (non-zero) vehicular density in the white area allows a simple model for the diffusion of an ideal template into this region.

A non-negative, real-valued function with support on a 2-dimensional template may be utilized to represent a non-uniform layout of vehicle densities. An exemplary implementation of the model requires that this function be discretized. A template is modeled as tiled into disjoint cells of constant intensity such as is shown in FIG. 4.

Figure 4:
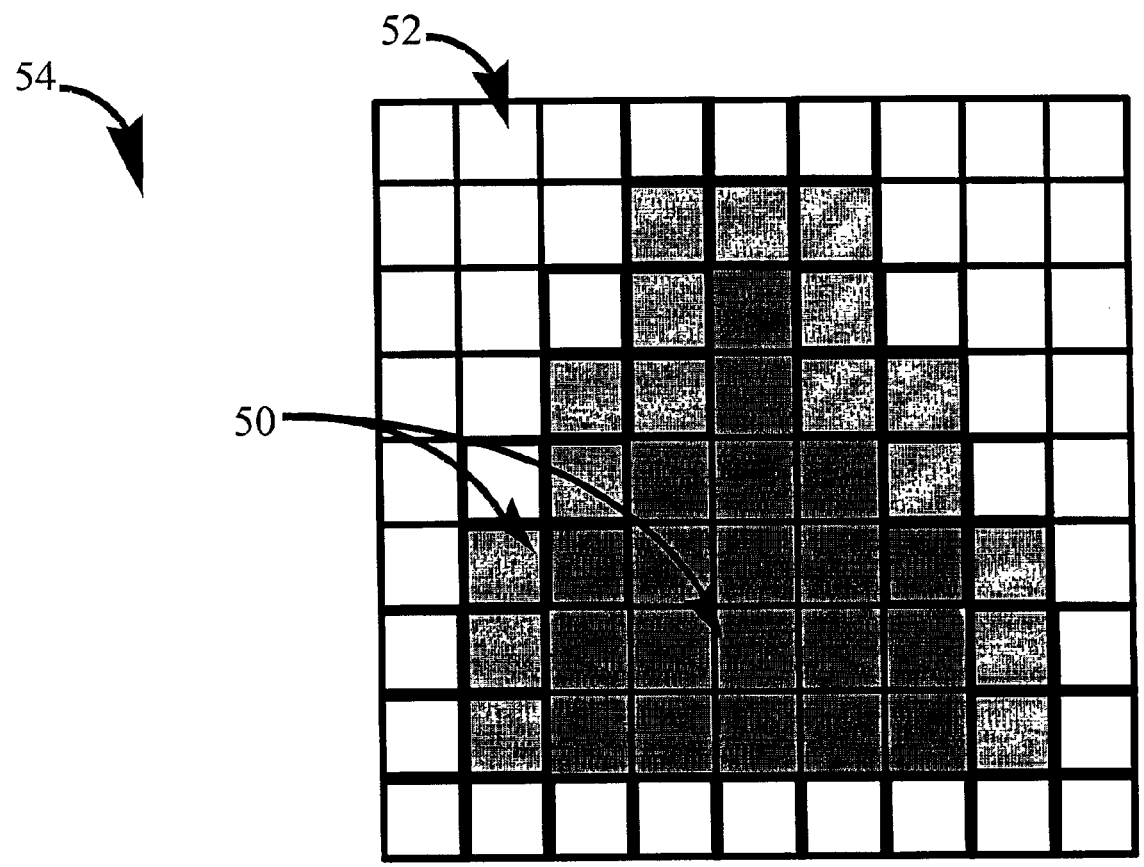
FIG. 4 illustrates an exemplary discretization of an ideal, non-uniform wedge template.

FIG. 4 illustrates an exemplary discretization of an ideal, non-uniform wedge template which includes a foreground 50, a background region 52 and an environment outside the template 54. All non-background regions of the template are considered to be foreground regions 50. The background intensity in the region around the formation in the template can be set to a low positive value, rather than zero, in order to produce a simple model of the diffusion of the ideal formation that is dependent upon terrain. A zero value indicates that there is no diffusion of the formation into the terrain because the Poisson intensity is zero.

A template-based algorithm restricts estimates of template type to a denumerable set called a library of template types that are realistic for the particular situation. For example, C={wedge, echelon, column, vee} where "C" is the set of available templates. In the above example, each template is indicative of an intention of a group of moving targets. A wedge template indicates aggressive movement towards contact with an enemy, an echelon indicates movement of troops and supplies in situations thought to be unsafe, a column indicates a formation for movement in situations that are thought to be safe (e.g., a convoy), and a vee indicates a group moving to attack in a situation believed to be unsafe. Templates have been used successfully in a diversity of recognition problems, for example see Grenander, U., "Advances in pattern theory", *The Annals of Statistics*, Vol. 17, No. 1, pp 1–30, 1989; and Grenander, U. and Miller, M. I., "Representation of knowledge in complex systems", *J. R. Statistical Society B*, Vol. 56, No. 4, pp 549–603, 1994. Template-based estimation allows prior knowledge of doctrine to act as a constraint on the formation estimate.

The templates used in modeling formations are mostly rigid models with a minimum number of degrees of freedom that describe the kind of template deformations that correspond to real-life variability. The templates are described by two types of parameters: external and internal. External parameters are position, orientation and scale. All templates share the same list of external-parameter types:

(1) $c \in C \subset N$ to indicate configuration (type can be represented by a natural number);

(2) $\vec{p} \in \Re^2$ to indicate position;

(3) $s \in \Re$ for scale; and (4) $\theta \in \Re$ to indicate rotation angle.

For notational clarity, $\vec{t} \equiv (\vec{p}, s, \theta)$.

The internal parameters of templates are unique to the template type. For example, a wedge template may have two parameters, apex angle and length, and a column template may have two parameters, aspect angle and length. Using templates creates a model of a realistic amount of variability using a minimum number of parameters while constraining the estimate to be within the library of templates.

The specific variables that are output from an exemplary embodiment of an algorithm of the present invention are the loglikelihood ratio and all of the above external variables to indicate the template type, position, scale, orientation and the internal variables to indicate the template deformation.

The present invention employs an algorithm to find the template configurations where the modified loglikelihood ratio exceeds a Bayes threshold when there is prior knowledge. The algorithm requires: (1) a library of formation templates; (2) a statistical model for the data; and (3) prior probabilities of formations (if available). These prior probabilities may be based upon previous observations of formations, upon terrain data, or upon other knowledge such as intelligence preparation of the battlefield. If prior knowledge is not available, the algorithm can find the maximum likelihood estimate.

The detection of a configuration, c, given data, d, is an inverse problem of the type described by Van Trees H. L., in "Detection, Estimation and Modulation Theory", John Wiley & Sons, 1968, p. 58. This problem is addressed by first constructing a forward statistical model, i.e., a data likelihood, p (d|c) and a prior probability, p(c). A uniform cost function may be used. In the inverse problem, the usual formulation for the conditional probability of the configuration given the data is:

$$p(c \mid d) = \frac{p(d \mid c)p(c)}{p(d)} \quad (1)$$

where the probability of the data p(d), is constant for a given measurement. For example, the maximum a posteriori (MAP) estimate is the value of c that maximizes the above conditional probability of c given the data.

Figure 5:
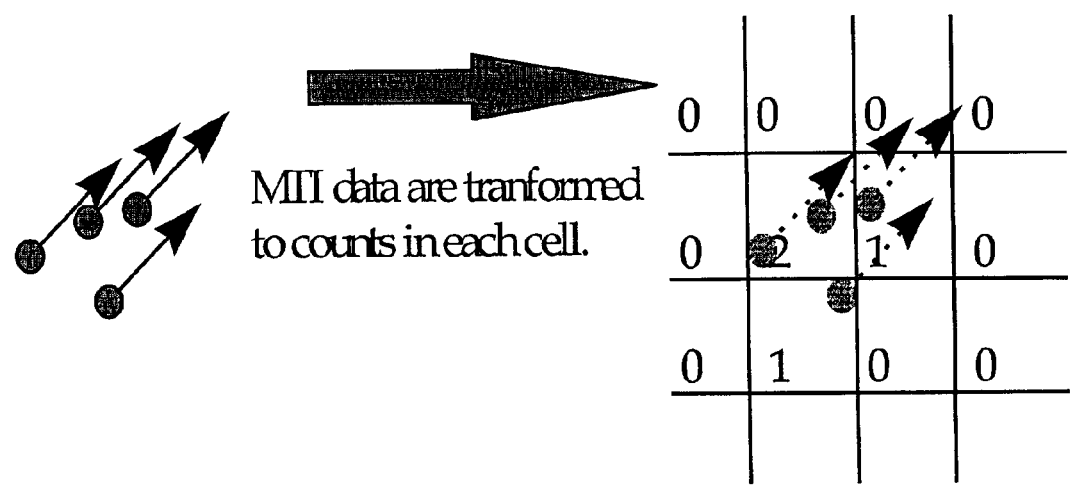
FIG. 5 illustrates an exemplary count statistics model for MTI data.

The essential elements of MTI data are point locations and associated range rates. Counting statistics can be formed by tiling the region under surveillance, then counting points in each cell as shown in FIG. 5.

In this first analysis, Poisson statistics with non-homogeneous intensities are assumed for the counting statistics of each cell. This model is a well-understood statistical model for point processes and therefore makes a good starting point for this analysis. The derivation of the likelihood function is discussed later.

A range-rate image of the MTI data can be constructed by computing the average range-rate of MTIs within each cell of the surveillance region. A concept of range-rate texture can be expressed as the sum of the absolute value of differences of range rates between neighboring tiles. Formations consist of vehicles that are moving together, so a necessary condition of a formation is that the MTI range rates, $\dot{r}$, do not differ by a large factor. This is characterized by a smooth texture in the range-rate image.

A group of MTIs with very different range rates will soon disperse and is either a formation that is breaking up, or never was a formation, i.e., is just ambient traffic. This group is characterized by a rough texture.

An exemplary expression for range-rate texture, w, for data underlying a template is:

$$\omega = -\Sigma_{n,m} |\dot{r}_{n,m} - \hat{\dot{r}}| \quad (2)$$

where $\hat{\dot{r}}$ is the mean range-rate of the MTI data under the template; $\dot{r}_{n,m}$ is the range rate in cell indexed (n, m); and (n, m) ranges through the data cells under the template.

This expression is near zero if the texture is smooth, and large if the texture is rough. This result is the same as assuming Laplace statistics on MTI range rates with a mean range-rate of $\hat{\dot{r}}$.

The counting and range-rate statistics are assumed to be statistically independent. The derivation of the factor of the likelihood function that is dependent upon count data can be thought of as a generalization of the 1-dimensional Poisson probability function for a random variable, n, with constant Poisson intensity, $\lambda$. For such a random variable, the probability of measuring N counts in an interval length, A, is:

$$Pr(n = N | \lambda) = \frac{(\lambda A)^N e^{-\lambda A}}{N!} \quad (3)$$

For the discretized template shown in FIG. 4, the realization of Poisson counts in each cell is statistically independent of the realizations in the other cells. Letting the J cells (each of area, A) in the template be numbered in sequence from left-to-right, top-to-bottom for notational simplicity, then the likelihood of receiving $\{N_1, N_2, \ldots N_J\}$ counts from cells numbered 1..J with individual intensities, $\{\lambda_1, \lambda_2, \ldots \lambda_J\}$ is the product of individual Poisson probabilities, as expressed using the following function:

$$Pr(\vec{N} | \vec{\lambda}; c, \vec{t}) = \prod_{j=1\ldots J} \frac{(\lambda_j A)^{N_j} e^{-\lambda_j A}}{N_j!} \quad (4)$$

where the dependence of $\lambda_j$ upon template position, orientation and scale, $\vec{t}$, is suppressed for notational clarity.

It is assumed that the MTI range-rates are Laplacian distributed and that they are statistically independent of each other. The assumption of Laplacian statistics is motivated because it is consistent with the notion of range-rate texture that is described in the previous section. Early results of numerical experiments seem to indicate that this is a better assumption than Gaussian statistics. An individual MTI range-rate, $\dot{r}$, in a formation that has an average range-rate, $\hat{\dot{r}}$, of has a probability-density function:

$$p(\dot{r}; \hat{\dot{r}}) = e^{-|\dot{r} - \hat{\dot{r}}|} \quad (5)$$

where the average range-rate, $\hat{\dot{r}}$, is a parameter that must be estimated for each hypothesized formation.

The joint probability density function of all the MTIs in a formation is:

$$p(\vec{\dot{r}}; \hat{\dot{r}}) = \prod_{k=1}^{K} e^{-|\dot{r}_k - \hat{\dot{r}}|} \quad (6)$$

where K is the number of MTIs in the formation; $\vec{\dot{r}}$ is the vector of range-rates of the K MTIs; and $\dot{r}_k$ is the range rate of the kth MTI.

The joint likelihood function is:

$$Pr(\vec{N}, \vec{\dot{r}} | \vec{\lambda}; \vec{t}; \hat{\dot{r}}) = \left(\prod_{j=1}^{J} \frac{(\lambda_j A)^{N_j} e^{-\lambda_j A}}{N_j!}\right) \left(\prod_{k=1}^{K} e^{-|\dot{r}_k - \hat{\dot{r}}|}\right) \quad (7)$$

where the index j ranges over cells; and the index k ranges over MTI points.

This is the likelihood of a marked Poisson point process. In this case the "mark" is the individual range rate associated with each MTI point. The points have Poisson statistics and the marks are Laplacian. The constant factor, $N_j!$, may be left out of the process of finding the template that maximizes the loglikelihood. This results in a relative loglikelihood, $$\ln Pr(\vec{N}, \vec{\dot{r}} | \vec{\lambda}; \hat{\dot{r}}: \vec{t}) = \sum_{j=1\ldots J} N_j \ln(\lambda_j A) - \lambda_j A - \sum_{k=1\ldots K} |\dot{r}_k - \hat{\dot{r}}|. \quad (8)$$

In exemplary embodiments of the invention, this expression (equation 8) is approximated by utilizing average range-rates in each cell so that the relative loglikelihood is approximated by, $$\ln Pr(\vec{N}, \vec{\dot{r}} | \vec{\lambda}; \hat{\dot{r}}: \vec{t}) = \sum_{j=1\ldots J} N_j \ln(\lambda_j A) - \lambda_j A - |\hat{\dot{r}}_j - \hat{\dot{r}}| \quad (9)$$

where $\hat{\dot{r}}_j$ is the average range-rate of the MTIs located in cell j. More specifically, the expression, $\ln Pr(\vec{N}, \vec{\dot{r}} | \vec{\lambda}, \hat{\dot{r}}: \vec{t})$ may be written as $\ln Pr((\vec{N}, \vec{\dot{r}} | \vec{\lambda}(c, \vec{t})\hat{\dot{r}})$ to indicate that the Poisson intensities in the loglikelihood depend upon the choice of template type, position, scale and orientation.

A likelihood-ratio test is then constructed by considering the null hypothesis to be an "empty" template. Such a template is one in which all cells are set to a nominal background intensity, $\lambda_o$. The corresponding background intensities are considered equal. Thus, in an empty template, there is no distinction between foreground and background; all cells are background cells. The likelihood ratio test is then, $$\ln \Lambda(\vec{N}, \vec{\dot{r}} | \vec{\lambda}, :\hat{\dot{r}}: \vec{t}) = \quad (10)$$

$$\sum_{j=1\ldots j} N_j \{\ln(\lambda_j A) - \ln(\lambda_0 A)\} - \{\lambda_j A - \lambda_0 A\} - |\hat{\dot{r}}_j - \hat{\dot{r}}|.$$

Finally, there is a scaling issue when there are only a few MTIs. The range-rate is scaled based upon the number of template foreground cells $N_{fg}$ that contain data and the percent of fill of the entire template foreground, $P_{fill}$, so the modified loglikelihood ratio is, $$\ln \Lambda^0(\vec{N}, \vec{\dot{r}} | \vec{\lambda}, :\hat{\dot{r}}: \vec{t}) = \quad (11)$$

$$\sum_{j=1\ldots j} N_j \{\ln(\lambda_j A) - \ln(\lambda_0 A)\} - \{\lambda_j A - \lambda_0 A\} - \frac{|\hat{\dot{r}}_j - \hat{\dot{r}}|}{N_{fg} * p_{fill}}.$$

The algorithm is a simple search for all possible template displacements (relative to the origin of the frame of data), orientations, scales, and template types, $c \in C$, where C is the library of all possible templates for the combination of values for which the modified loglikelihood ratio is greater than a threshold, {detected formations}={$c, \vec{t}$ such that $1n\,\Lambda^0(\vec{N}, \vec{\dot{r}} | \vec{\lambda}, \hat{\dot{r}}: \vec{t})$> threshold}. (12)

Because model order is unknown, i.e., the number of formations in a scene is not known in advance, a formation is declared whenever the loglikelihood ratio is greater than a Bayes threshold.

Figure 6:
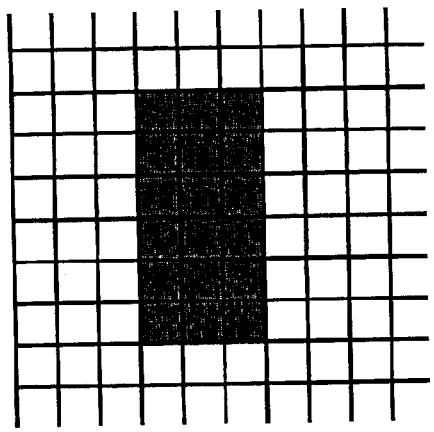
FIG. 6 is an illustration of an exemplary set of templates.
Figure 6:
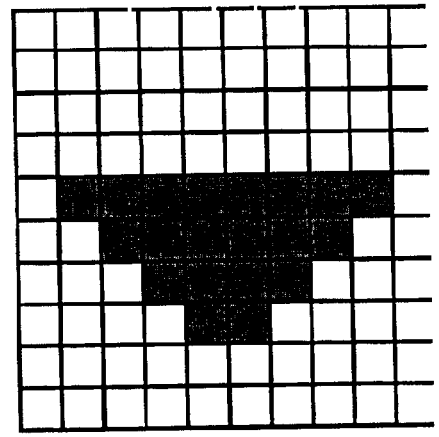
Figure 6:
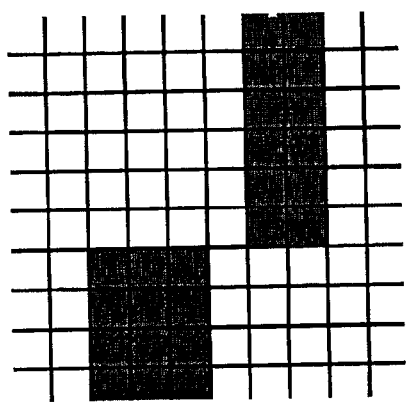
Figure 6:
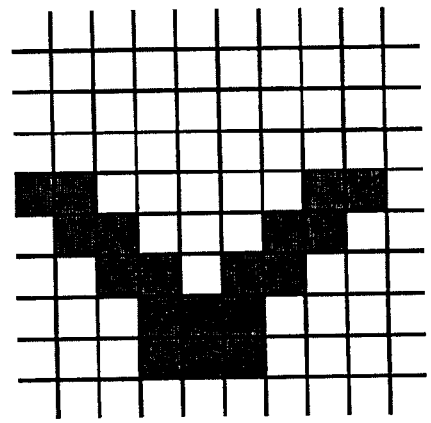

An exemplary embodiment of the invention has a stored library of templates. FIG. 6 illustrates four templates which make up the template library in an exemplary embodiment of the invention. In exemplary embodiments, data can be provided from one of three sources: (1) unclassified synthetic data; (2) a data file; or (3) subscription to a data stream-server. The software conducts a positional search in the data for each template at various scales and orientations as described in further detail later. The output of the software that is utilized for the numerical experiments is the combination of template type, position, scale and orientation that has the greatest loglikelihood for each data set.

The software templates may be implemented using various formats, for example, the data may be binary data and/or textual data. The templates are capable of allowing variations in vehicular density. In the templates shown in FIG. 6, the dark area represents the actual formation, a region of greater vehicular density than the surrounding template background (white). In both binary and non-binary templates, the background is defined to be that region in the template which surrounds the (possibly multi-valued vehicular density) formation.

Because of the effects such as terrain and weather, a real formation may diffuse outside of the boundaries of its "ideal" geometry. Diffusion increases background vehicular density in the vicinity of the formation. It can be modeled in an approximate way by increasing the density values of the background region of the template. The diffusion of foreground into background is investigated in the numerical experiments.

Templates and environments that have high vehicular density (vehicles per cell) in the foreground are considered dense. In exemplary embodiments, two or less vehicles per cell indicates a sparse environment and three or more vehicles per cell indicates a dense environment.

A small set of numerical experiments have been performed in order to get a general idea how well the formation-recognition software of the present invention performs in dense and sparse environments, and secondarily, as a function of template density and diffusion. Table I lists the variations of scenario characteristics for which performance of the present invention have been investigated, namely the density of the MTI clutter environment, the density of the template foreground, and diffusion of the template foreground into the template background. Clutter is defined to be MTIs that are not part of the formation.

A simple expression for signal-to-noise ratio (SNR) can be constructed by taking the ratio of the formation vehicle-density to that of the environment, but there are some ambiguities. For example, suppose a template with an average foreground-density of 5 MTIs/cell is positioned in an environment with an average of 3 MTIs/cell. In the synthetic-data software the formation density replaces the environment density simulating a situation in which the formation displaces the ambient traffic. The cells that result in the region of the formation have an average of 5 MTIs/cell because the environmental traffic of 3 MTIs/cell has been replaced by the formation. The effect is the same as if a formation with a foreground of 2 MTIs/cell had been added to an environment of 3 MTIs/cell. From the addition point of view, the signal-to-noise ratio is 2/3; from the replacement point of view, the signal-to-noise ratio is 5/3. In the example, the formation densities replace the environment densities and the replacement point of view signal-to-noise ratio is utilized, so results involving signal-to-noise ratio are conservative.

Figure 7:
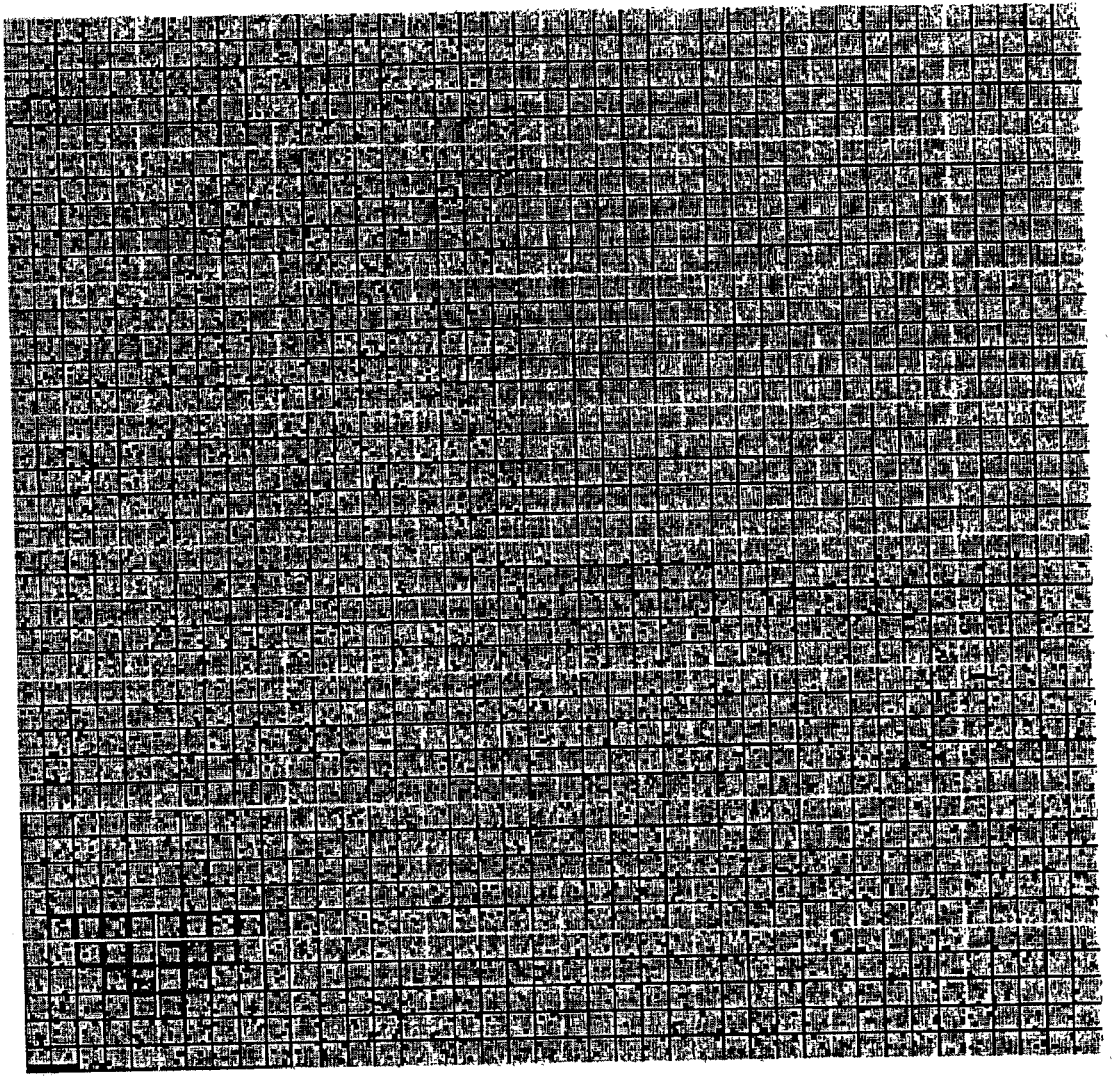
FIG. 7 is an illustration of exemplary synthetic MTI data for a dense environment with an overlay indicating the position of data synthesized from a dense template.

In the experiments, template and environment MTI density were set at dense and sparse values so that formation recognition results compared under various conditions. Diffused and non-diffused templates were also compared. The diffused templates have backgrounds that are set to a value that is intermediate to the template foreground and the average scene-density. For example, in Table I the diffused dense-template in a dense environment (row 1, column 1) has a foreground average-intensity, f, of 5 MTIs per cell in an environment with an average of e=3 MTIs per cell. The template-background average intensity, b, is set to the intermediate value of 4 MTIs per cell. This template and environment are illustrated in FIG. 7. A sparse template in dense environments is not thought to be a significant scenario, but is included for completeness. The empty region in FIG. 7 is devoid of any MTI data.

TABLE I

| | Template | | | |
|---|---|---|---|---|
| | Diffusion of foreground | | No Diffusion of foreground | |
| Environment | Dense | Sparse | Dense | Sparse |
| Dense | f = 5, b = 4, e = 3 | Data not available | f = 5, b = 3, e = 3 | f = 1, b = 0.5, e = 3 |
| Sparse | f = 5, b = 2.5, e = 1 | f = 2, b = 1, e = 0.5 | f = 5, b = 1, e = 1 | f = 2, b = 0.5, e = 0.5 |

Sixteen random data-sets were run for each combination of scenario characteristics. These data sets correspond to the generation of four data sets for each of the four template types (at full scale) in the exemplary library. Each run was scored.

The scoring system is designed to allow for "detections" as well as "recognitions". In the numerical experiments, a detection is defined as a result in which the software places a possibly incorrect template overlapping (by more than 50%) a known location of the formation in the data. A recognition is defined to be the correct template at the correct orientation and scale that is placed no more than one cell away (about 10% of the template size) of the known location of the formation in the data. Detections were scored as a "1" and recognitions were scored as a "2". All other events, called "misses" were scored as a zero. A perfect score for any particular combination of scenario characteristics is 32, that is 16 data sets in which the software made a recognition (scored a "2"). The results in Table II are scaled by 32 (raw scores are divided by the maximum possible score of 32). A score of 1.0 means that the software made a perfect recognition (scored "2") in each of the sixteen data sets, but that every recognition was incorrect, or some combination of recognitions, detections and misses. A score of 0.5 could mean that the software made correct detections in each of the sixteen data sets, but that every recognition was incorrect, or some combination of recognitions, detections and misses.

TABLE II

| | Template | | | |
| --- | --- | --- | --- | --- |
| | Diffusion of foreground | | No Diffusion of foreground | |
| Environment | Dense | Sparse | Dense | Sparse |
| Dense | .78 | | .59 | 0.5 |
| Sparse | 1.0 | .63 | .97 | .78 |

Figure 8:
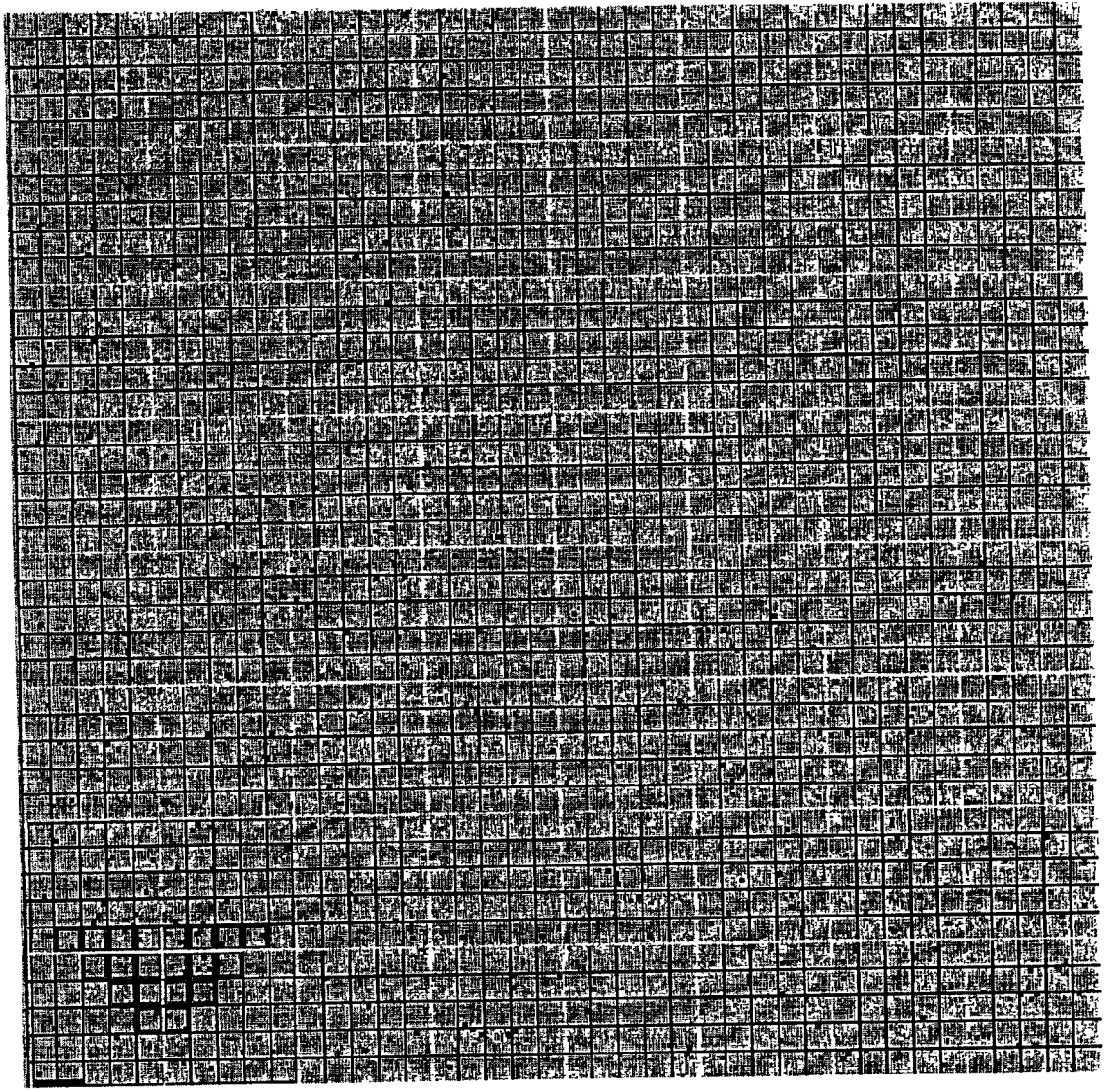
FIG. 8 is an illustration of exemplary synthetic MTI data for a sparse environment with an overlay indicating the position of data synthesized from a sparse template.

Table III interprets the performance scores and associates them with the signal-to-noise ratios. The most obvious result is that the algorithm is very effective in scenarios in which the formation is very dense and the surrounding environment is very sparse, as evidenced by the perfect score of 1.0 and nearly perfect 0.97 for diffused-foreground and non-diffused foreground (respectively) templates in sparse environments. Sparse templates in sparse backgrounds do not perform as well as dense templates in dense environments even if the signal-to-noise ratio is relatively large. This appears to be due to the fact that there isn't much data in these situations to strongly drive a particular solution. This situation is illustrated (for a non-diffused template) in FIG. 8.

Diffused dense-templates perform better (than non-diffused templates) in dense environments. Non-diffused sparse templates perform better (than diffused templates) in sparse environments. Table III, shown below, illustrates performance vs. scenario characteristics.

TABLE III

| | Template | | | |
| --- | --- | --- | --- | --- |
| | Diffusion of foreground | | No diffusion of foreground | |
| Environment | Dense | Sparse | Dense | Sparse |
| Dense | SNR = 1.67 Good | | SNR = 1.67 Moderate | SNR = 0.33 Moderate |
| Sparse | SNR = 5 Excellent | SNR = 4 Moderate | SNR = 5 Excellent | SNR = 4 Good |

Figure 9:
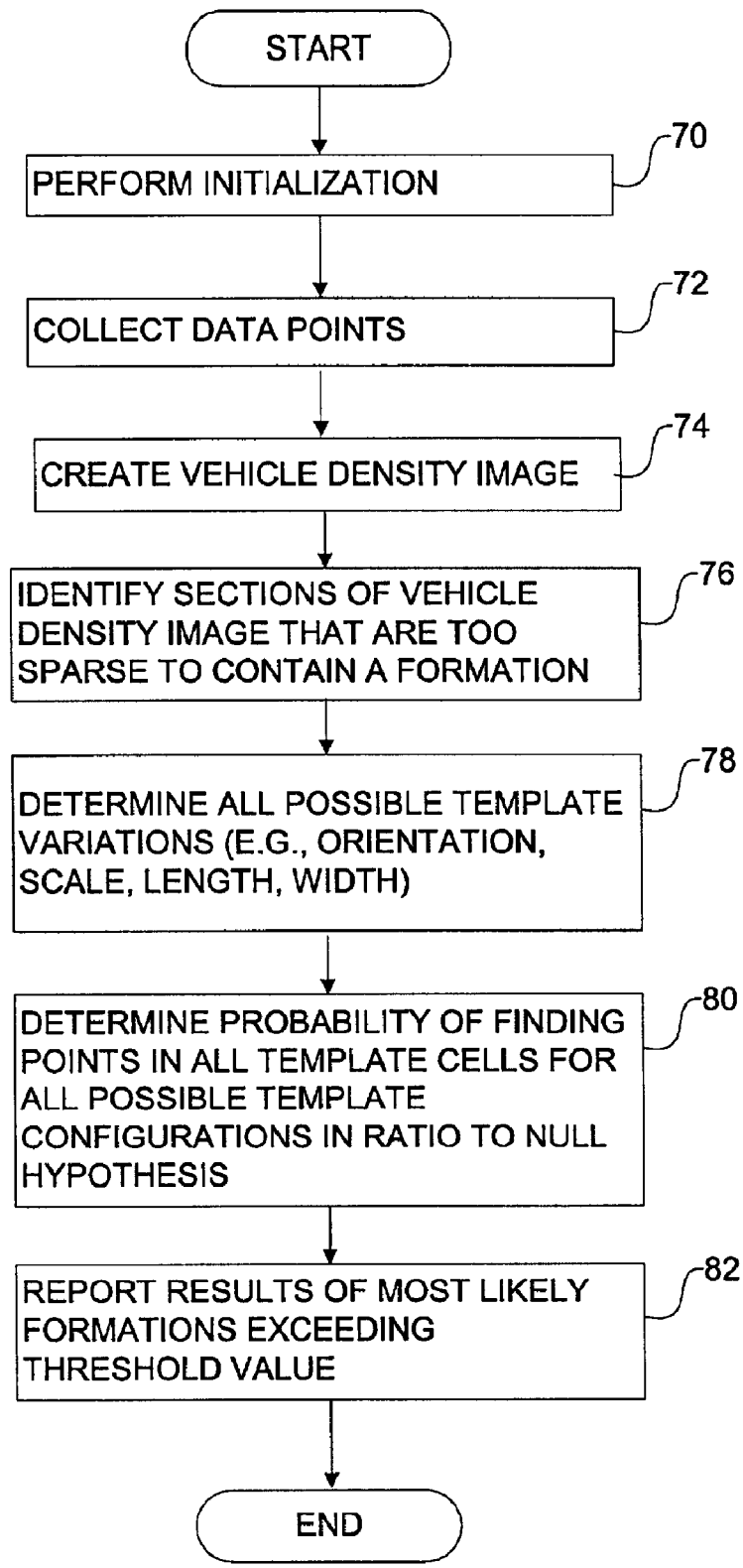
FIG. 9 is a flow diagram illustrating exemplary logic for performing automatic recognition of formations in moving target indication data in accordance with the present invention.

FIG. 9 is a flow diagram illustrating exemplary logic for performing automatic recognition of formations in moving target indication data in accordance with the present invention. The logic moves from a start block to block 70 where initialization is performed. The initialization includes defining the set of templates, scales to check, rotations to check, etc. After the initialization has been performed, the logic moves to block 72 where data points are collected. For example, in the exemplary embodiment discussed, locations of ground based vehicles are collected. The data may be collected from various sources. For example, an external system may collect the data and forward it to the system, for example via a wireless network.

After the data has been collected, the logic moves to block 74 where a vehicle density image is created. The vehicle density image is a graphical depiction of the collected data points. The logic then moves to block 76 where sections of the vehicle density image that are too sparse to contain a formation are identified. The logic then moves to block 78 where all possible template variations are determined. For example, each of the possible templates are considered with varying rotations, scales, lengths, widths, etc. The logic then moves to block 80 where the probability of finding points in all template cells for all possible template configurations in ratio to the null hypothesis is determined. In other words, all of the possible configurations determined in block 78 are considered. Each template is considered with varying parameters, such as length, width, rotation and scale, and is analyzed for each of the configurations. The logic then moves to block 82 where results are reported. For example, a graphical depiction including the vehicle density image with the most likely template configuration overlaid may be displayed. The reported results represent the most likely formation(s) based on the template configurations exceeding a threshold value. It will be appreciated that it may be possible that no formation can be determined. The logic of FIG. 9 then ends.

Additional modifications and improvements of the present invention may also be apparent to those of ordinary skill in the art. Thus, the particular combination of parts described and illustrated herein is intended to represent only a certain embodiment of the present invention, and is not intended to serve as a limitation of alternative devices within the spirit and scope of the invention. For example, the exemplary embodiment illustrated and described herein is directed to ground moving target data (e.g., in a military environment). It will be appreciated that the present invention can be applied to other contexts. For example, the present invention may be used in the recognition of shapes that have been illuminated by light sources. These may include applications to recognizing underwater mines or other shapes (above or below the water) with a laser radar (LIDAR). The present invention may also be used in applications such as the recognition of shapes in the field of position emission tomography or X-ray photography. Another exemplary use of the present invention is the recognition of objects or shapes in video or photographic data.

What is claimed is:

1. A system for determining a military threat level associated with a plurality of separate objects within a geographical area of interest, the system comprising:
   a) a data detector for detecting and imaging the plurality of separate objects located within the geographical area of interest;
   b) a threat intensity detector for determining an intensity of the plurality of separate objects within the geographical area of interest; and
   c) a threat immediacy detector for determining the immediacy of a threat posed by the plurality of separate objects based on an organizational pattern of the plurality of separate objects.

2. The system of claim 1, wherein the threat intensity detector generates a density image.

3. A system for determining a military threat level association with a collection of detected objects imagined within a geographical area interest, the system comprising:
   a) a data detector for detecting and imagining objects located within the geographical area interest;
   b) a threat intensity detector for determining the intensity of detected objects within the area of interest; and
   c) a threat immediacy detector for determining the immediacy of a threat posed by the detected objects based on an organizational pattern of the detected objects, the threat immediacy detector comprises:
      i) an automatic shape recognition module for comparing a density image generated by the threat immediacy detector to predefined set of examples, each of the templates being representative of an organizational pattern and determining a most likely formation based on the comparison of the density image to the predefined set of templates; and ii) an interference reporter for reporting the most likely formation in terms of the immediacy of the threat posed by detected objects.

4. The system of claim 3, wherein a plurality of configurations are defined for each template in the predefined set of templates.

5. The system of claim 4, wherein the automatic shape recognition module compares the density image to each of the configurations defined for each template in the predefined set of templates.

6. The system of claim 5, wherein the configurations defined for each template in the predefined set of templates are based on at least one parameter.

7. The system of claim 6, wherein the at least one parameter comprises at least one external parameter.

8. The system of claim 7, wherein the at least one external parameter comprises:

a) position;
b) orientation; and
c) scale.

9. The system of claim 6, wherein the at least one parameter comprises at least one internal parameter which is unique to each of the templates.

10. The system of claim 3, wherein there are a plurality of most likely formations.

11. The system of claim 3, wherein the templates comprise:

a) a wedge template;
b) an echelon template;
c) a column template; and
d) a vee template.

12. A method for determining a military threat level associated with a collection of detected objects located within a geographical area of interest, the method comprising:

a) defining a set of formation templates, wherein each formation template is representative of an organizational pattern and comprises a plurality of cells;
b) defining a plurality of configurations for each of the formation templates;
c) defining the geographic area of interest;
d) detecting the collection of objects within the geographical area of interest, wherein each detected object in the collection of detected objects has a geographical location;
e) creating a density image based on the geographical locations of the collection of detected objects;
f) identifying sections of the density image that are too sparse to contain a formation;
g) determining a probability of finding points in each of the formation template cells for each of the configurations of each of the formation templates;
h) determining a probable formation based on the probability of finding points in each of the template cells for each of the configurations of each of the formation templates, wherein the probable formation is indicative of the threat of the collection of detected objects; and
i) reporting the probable formation.

13. The method of claim 12, further comprising determining a strength of the threat based on a density of the probable formation.

14. The method of claim 12, wherein the objects are moving vehicles.

15. The method of claim 14, wherein the moving vehicles are ground vehicles.

16. The method of claim 12, wherein the set of formation templates comprises:

a) a wedge template;
b) an echelon template;
c) a column template; and
d) a vee template.

17. The method of claim 12, wherein the configurations for each of the formation templates are based on at least one parameter.

18. The method of claim 17, wherein the at least one parameter comprises at least one external parameter.

19. The method of claim 18, wherein the at least one external parameter comprises:

a) position;
b) orientation; and
c) scale.

20. The method of claim 18, wherein the at least one parameter comprises at least one internal parameter.

21. The method of claim 12, wherein determining the probable formation results in a determination that there are a plurality of probable formations.

22. The method of claim 12, wherein determining the probable formation results in a determination that there are no probable formations.

* * * * *